United States Patent [19]
Wald

[11] Patent Number: 5,564,622
[45] Date of Patent: Oct. 15, 1996

[54] REUSABLE DEVICE HAVING POUR SPOUT FOR CARTONS HAVING GABLE TOPS

[76] Inventor: Hy Wald, P.O. Box 637, Ft. Washington, Pa. 19034

[21] Appl. No.: 529,131

[22] Filed: Sep. 15, 1995

[51] Int. Cl.$^6$ ....................................... B65D 5/74
[52] U.S. Cl. .................. 229/125.04; 222/81; 229/125.42
[58] Field of Search ......................... 229/125.04, 125.14, 229/125.15, 125.17, 125.39, 125.42; 220/277, 278; 222/81, 82, 541, 566, 567

[56] References Cited

U.S. PATENT DOCUMENTS

| | | | |
|---|---|---|---|
| 2,453,133 | 11/1948 | Jones | 220/278 |
| 2,523,426 | 9/1950 | Gray | 222/81 |
| 2,552,155 | 5/1951 | Danielson | 222/81 |
| 2,585,538 | 2/1952 | Daniels | 222/81 |
| 2,751,119 | 6/1956 | Manning, Sr. | 222/81 |
| 3,902,652 | 9/1975 | Malcolm | 222/81 |
| 4,049,157 | 9/1977 | Carson | 222/81 |
| 4,801,007 | 1/1989 | Rule | 222/81 |
| 4,907,722 | 3/1990 | Ueda et al. | 220/278 |
| 5,076,493 | 12/1991 | Anderson | 229/125.15 |
| 5,273,171 | 12/1993 | Steele-Rowland et al. | 220/278 |

FOREIGN PATENT DOCUMENTS

| | | | |
|---|---|---|---|
| 505851 | 9/1992 | European Pat. Off. | 229/125.04 |
| 2659275 | 7/1978 | Germany | 229/125.42 |

*Primary Examiner*—Gary E. Elkins
*Attorney, Agent, or Firm*—Caesar, Rivise, Bernstein, Cohen & Pokotilow Ltd.

[57] ABSTRACT

A closure device for a carton having a gable top. The device comprises a flanged cap including a pair of inner surfaces defining a longitudinal slot. The device further includes inclined side walls extending from the flanged cap and adapted to make a snug fit with the gable top. The device further includes front and rear walls contiguous with the inclined side walls and angled side walls adjacent the inclined side walls extending from the rear wall toward the front wall. The inclined side walls and angled side walls are spaced a distance apart to define a recess. The carton comprises a pair of vertical strips have an upper and lower edge, and inclined sidewalls extending outwardly and downwardly from the lower edge of the vertical strips. The strips have inner and outer surfaces. The inner surfaces of the strips are sealed together along their longitudinal length. The outer surfaces of the strips of the carton are disposed within the longitudinal slot in a confining relationship. The device includes a recloseable pour spout which is in fluid communication with the interior of the container to pour the contents therethrough. The spout includes at its opposite end a puncturing tip to puncture the container to permit the egress of the container contents through the recloseable spout.

8 Claims, 3 Drawing Sheets

REUSABLE DEVICE HAVING POUR SPOUT FOR CARTONS HAVING GABLE TOPS

BACKGROUND OF THE INVENTION

This invention relates generally to an inexpensive device which may be applied to the top of a standard liquid containing carton (e.g., juice, milk, etc.) to permit the carton to be opened and closed so that the contents are protected against odor, dust, dirt or other contaminants, and against spillage of the contents. The device includes a resealable pour spout to permit the easy dispensing of the contents of the container.

The packaging materials for milk and fruit juices include glass and plastic and are often made of heavy paper or cardboard cartons, particularly for half-gallon sizes or less. The paper or cardboard cartons have gable tops, are often wax-impregnated or wax coated, and multi-layered strips at the top of the carton are heat sealed together to close the carton. By prying apart the strips at one side of the carton, a pouring spout is formed to dispense the contents from the carton.

After the desired amount of contents are dispensed, the spout may then be folded back inward. However, the closure is now imperfect since the heat seal on the pried portion of the strip is broken and the various layers of the strip are no longer in close contact with each other. Thus, the contents of the carton are subject to contamination by moisture, odors, dust, dirt and the like. Further, the contents of the carton may spill from the carton. In addition, often times with these types of containers, the contents may slightly separate while being stored. For example, orange juice held in such a container will typically separate to a relatively clear liquid at the top of the container with denser liquid and/or solids toward the bottom of the container. When one dispenses such a material from the container without agitating the entire container and its contents to mix them properly, an uneven product is dispensed. However, if one attempts to shake such container after it has already been initially opened, then one must hold the top of the carton in a closed position and then achieve proper agitation. It is somewhat difficult to accomplish both tasks simultaneously, especially for children or for individuals whose hands may suffer from arthritis or other ailments.

The present invention provides an inexpensive, easily applied, closure and dispensing device for closing and protecting the contents of cartons after they have been opened. The closure device may be dimensioned to fit any standard size carton, i.e., one pint, one quart, one-half gallon, etc. The closure device includes a resealable pour spout to permit the easy dispensing of the container contents.

Previous devices for the closure of gable types of cartons have been incorporated in the carton design and have been manufactured and supplied with the carton. For example, U.S. Pat. No. 3,680,771 (Blunsdon), shows a closure device where the container includes a flap which folds over one of the top strips of the container with a spring clip inserted over the flap to provide the closure.

In U.S. Pat. No. 2,336,503 (Ringler) is disclosed a gable or bellows container sliding closure comprised of a slotted closure member which slides over the top strip of the container. Again, in this case, the containers are specifically designed to incorporate the closure mechanism, and the closure element is supplied with the container when the container is manufactured.

In U.S. Pat. No. 2,030,134 (Burgener) is disclosed a closure device for a flat top box which is employed where the contents are removed from the box by punching holes in the top of the box.

Other types of devices which utilize clip-type closures which have to be slipped onto or about the outer surfaces of the strips which define the opening in the gable top of the carton are shown in U.S. Pat. Nos. 3,381,883 (Harris), 3,458,110 (Goldman) and 3,463,380 (Cooperstein).

All of the foregoing problems were solved with my prior invention for a reusable closure device for cartons having gable tops, U.S. Pat. No. 4,646,961, the entire disclosure of which is incorporated by reference herein. That device also protects the contents of cartons having gable tops from odor, dust, dirt or other contaminants and from spillage after the carton is opened. The closure device is placed upon the carton and covers the top part of the carton. A longitudinal gap in the device encloses and presses together the top strips of the carton, which were pried apart to form a spout for dispensing the contents of the carton, thereby closing the carton. The device comprises a flanged cap with a pair of inner surfaces defining a longitudinal slot and included inclined side walls extending from the flanged cap and adapted to make a snug fit with the cap top, with there being front and rear walls extending downwardly from the flanged cap. Also, the front and rear walls extended between the inclined side walls, and there was a pair of skirts which extended from the lower edge of each of the inclined side walls and spanned the lower portions of the front and rear walls.

For larger cartons, the device incorporates a section for holding the carton with a handle for tilting the carton to dispense its contents. In one embodiment, the closure section of the device snaps onto the holding section to close the carton. In a second embodiment, the closure section is connected to the holding section by a hinge.

The closure device of my U.S. Pat. No. 4,646,961 has worked well. It need only be applied to the gable top without any special guidance or manipulation. However, I recognized a need to eliminate a considerable portion of the plastic used in a closure device, as well as a need to facilitate the gripping of a closure device from the end walls in lieu or of supplementary with grasping of the closure device along the top section or flanged cap or tab. Accordingly, in my second U.S. Pat. No. 4,793,549, the entire disclosure of which is incorporated by reference, is disclosed a modified reusable closure device for cartons for gable tops, which is similar to my prior invention. However, in this invention, the closure device possesses shortened inclined walls as well as end walls having a lower arcuate convex edge to facilitate a gripping by the fingers of a user. This device may be used with all standard types of containers and does not require any special container designs.

The closure device of my pending application Ser. No. 08/310,554, filed Sep. 22, 1994, entitled Reusable Closure Device for Carton Having Gable Tops, the entire disclosure of which is incorporated by reference herein, also includes a device which is intended to be slid onto a gable top container.

In contrast, the present invention is directed to a device which is pushed onto the gable top container so that a portion of the pouring spout punctures the container in a resealable manner to permit pouring of the container contents through the pour spout.

Other types of closure devices may be found in the following references: U.S. Pat. No. D.182,215 (Wilson), U.S. Pat. Nos. 2,533,539 (Vivian), 2,586,931 (Gammon), 2,647,524 (Heavens, Jr.), 2,896,812 (Paprocki), 2,906,439 (Santuci, Sr.), 3,217,967 (Jackson), 3,373,897 (Haines), 3,381,875 (Tunick), 3,488,078 (Cooperstein), 3,693,864 (Wilkins), 4,109,351 (Coffey), 4,323,188 (Dickerson), 4,498,585 (Gordon et al.), 4,588,081 (Newsome et al.) and 4,619,398 (Laramie); and Norwegian Patent No. 81,458.

Accordingly, a need exists for a reusable closure device for cartons having gable tops which includes a pour spout for dispensing the container contents.

SUMMARY OF THE INVENTION

These and other objects of this invention are achieved by providing a closure device for a carton having a gable top. The device comprises a flanged cap including a pair of inner surfaces defining a longitudinal slot. The device further includes inclined side walls extending from the flanged cap and adapted to make a snug fit with the gable top. The device further includes front and rear walls contiguous with the inclined side walls and angled side walls adjacent the inclined side walls extending from the rear wall toward the front wall. The inclined side walls and angled side walls are spaced a distance apart to define a recess.

The carton comprises a pair of vertical strips having an upper and lower edge and inclined sidewalls extending outwardly and downwardly from the lower edge of the vertical strips. The strips have inner and outer surfaces. The inner surfaces of the strips are sealed together along their longitudinal length, so that when one end of the strips are pried apart, a pouring spout is formed for dispensing contents from the carton. The outer surfaces of the strips of the carton are disposed within the longitudinal slot in a confining relationship and the inclined sidewalls of the carton are at least partially located within the recess.

The device further includes a recloseable pouring spout having at one end, a container puncturing tip which may be surrounded by a seal to prevent leakage from the container at the puncture point.

In one embodiment, the pouring spout is located on one of the inclined walls.

In a second embodiment, the pouring spout is located on the lower portion of the front wall of the device to permit pouring from the container side wherein the puncturing tip punctures the side wall of the container.

In a third embodiment, the spout is located on an upper portion of the front wall of the device so that the puncturing tip punctures an angled side wall forming the gable top portion of the container.

DESCRIPTION OF THE DRAWINGS

Other objects and many attendant features of this invention will become readily appreciated as the same becomes better understood by reference to the following detailed description when considered in connection with the accompanying drawings wherein.

DETAILED DESCRIPTION OF THE PREFERRED EMBODIMENTS

Figure 1:
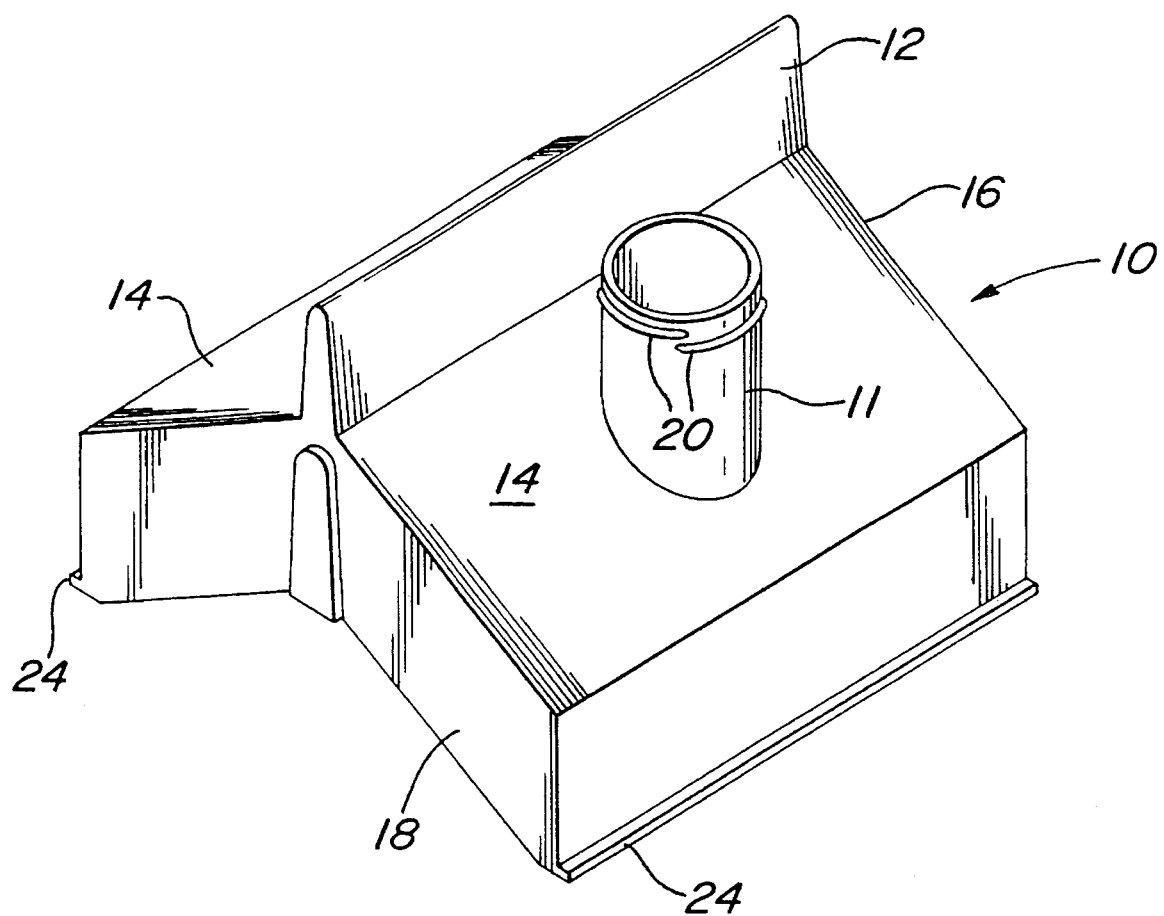
FIG. 1 is an elongated three-dimensional view of a first embodiment of the closure device of the present invention showing the pouring spout on an inclined wall.

Referring now to various figures of the drawings where like reference numerals refer to like parts, there is shown at 10 in FIG. 1, a first embodiment of the closure device constructed in accordance with this invention to be used with a conventional carton (shown in phantom in FIGS. 2–7) having a gable top. The device 10 is arranged to be disposed over the gable top of a carton and has a resealable pour spout 11 extending outwardly from the device. Since the pour spout 11 is resealable, it prevents the entry of contaminants, odors or air, while also preventing the contents in the carton from spilling after the device is disposed over the gable top.

The device 10 basically comprises a flanged cap or tab 12 with a pair of inclined side walls or wings 14. The device 10 includes contiguous front end wall 16 and rear end wall 18.

Figure 4:
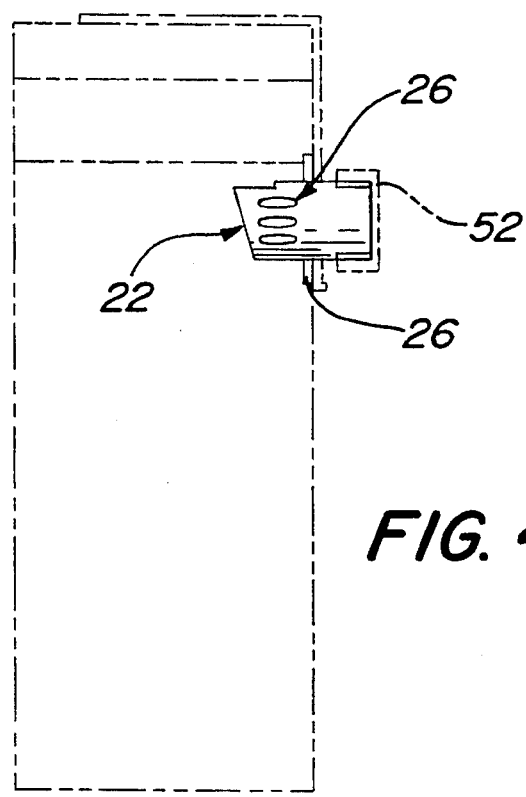
FIG. 4 is a side, partially in cross-section view of the closure device shown in FIG. 3, with the container and removable spout lid shown in phantom.
Figure 7:
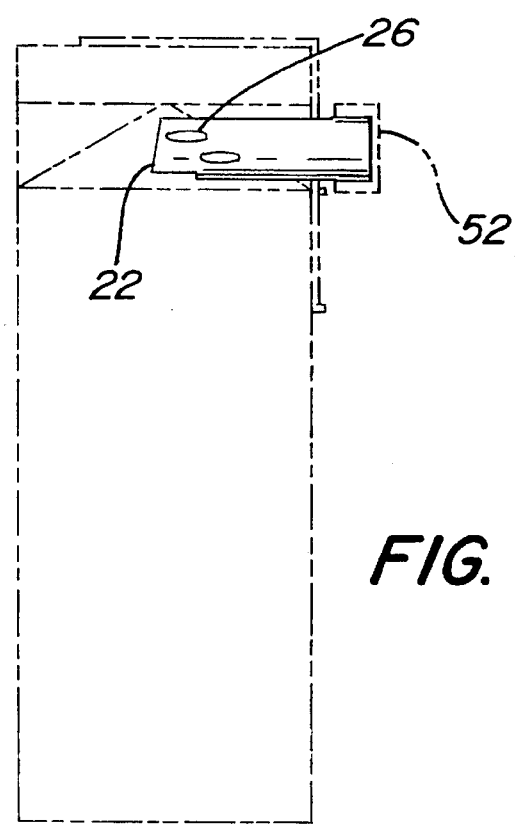
FIG. 7 is a side, partially in cross-section view of the closure device shown in FIGS. 2 and 3, with the container and removable spout lid shown in phantom.

Extending outwardly from one of the inclined walls 14, is the resealable pour spout 11, which when disposed over the gable top of a carton, is in fluid communication therewith. The spout 11, includes conventional threads 20 for engaging a conventional cap (shown in phantom in FIG. 4) to reseal the container after the container has been opened either with the device, or manually prior to applying the device 10 of the present invention. In order to dispose the device onto a gable top container, the device includes a puncturing tip 22 as shown in FIGS. 4 and 7. The puncturing tip 22 is along the longitudinal axis of the spout 11 at the opposite end thereof. Although the puncturing tip is not shown in FIG. 1 (it is present below one of the inclined side walls 14), suffice it to say that it functions in the same manner as the tip shown in FIGS. 4 and 7. Thus, when one wishes to dispose the device 10 on a container, the tip 22 is placed adjacent the desired entry point therefor. So for example, with the device 10 shown in FIG. 1, the puncturing tip would be located above and adjacent the inclined wall 14. One then merely needs to apply pressure on the device 10 in a downward direction so that the tip 22 punctures the gable top inclined wall and the device is secured onto the container. One can then access the container contents by merely removing the cap (not shown) by for example, unscrewing a conventional container cap made of a resilient material such as plastic, rubber, etc. As shown in FIGS. 4 and 7, the puncturing tip 22 is preferably angled and pointed to facilitate pouring and puncturing. The tip 22 may also include holes 26 to assist in the container contents flowing through the spout 11 into the desired container (not shown). In addition, as shown in FIG. 4, the device 10 includes a sealing ring 26 located about the periphery of the puncturing tip 22 so that when the device 10 is pressed against the container, the seal acts to prevent the container contents from leaking through when poured and also prevents the entry of contaminants into the container. The seal 26 may be made of any suitable material such as silicone, rubber, etc.

The device 10 may also include the stiffening ribs 24 shown which provide stability to the device 10 and may be integrally molded with the device 10 in a conventional fashion.

The carton which may be closed utilizing the present invention as a standard carton as shown in FIGS. 4–7, which is in prevalent use for holding milk, juices and other types of materials. Thus, the carton comprises a base, a pair of side walls, a front and back panel, and a pair of inclined panels which terminate at their upper end in a pair of strips.

At the time the carton is manufactured, after the carton is filled with its contents, the strips are sealed together longitudinally along their length to close the carton. The strips may be sealed with glue, hot melt glue or heat sealing or other conventional means.

As in conventional gable top cartons, to gain access to the contents of the carton, the user grasps the front ends of the inclined panels to pry apart the front end of the strips to separate them. The strips are double layer, so that a spout (not shown) may be formed by pulling back (outward) the inside layer of each of the strips. The carton contents may then be dispensed via the spout. After use, the inner layers of the strips are pushed back so that they are again parallel with the outer layers of the strips. However, since the seal has been broken, a gap exists, whereby moisture, odors, dust, dirt and the like can contaminate the contents of the carton. Further, if the carton is inadvertently tipped over, its contents may be spilled.

When the closure device 10 is placed over a carton which has previously been opened, it will close the carton in a snug fit and protect the contents of the carton against contamination and spillage.

Figure 2:
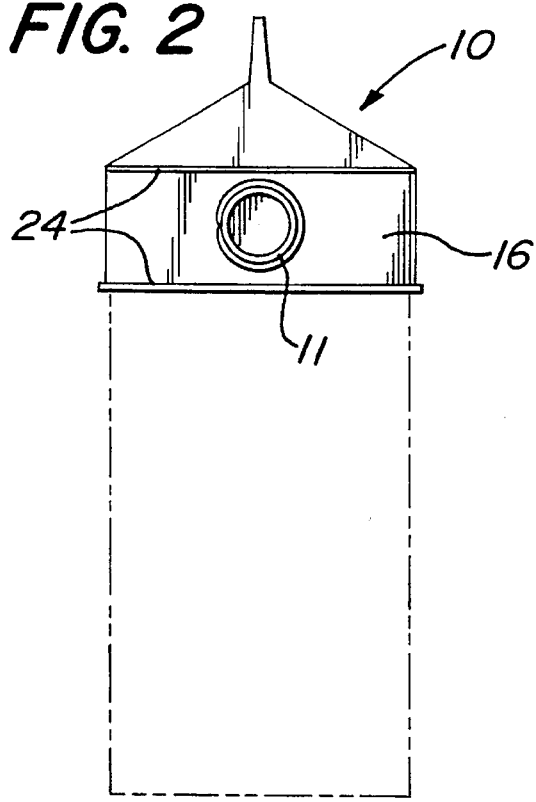
FIG. 2 is a front elevational view of a second embodiment of the closure device of the present invention placed on a container shown in phantom, with the spout of the device being located on the lower portion of the front wall of the device.
Figure 3:
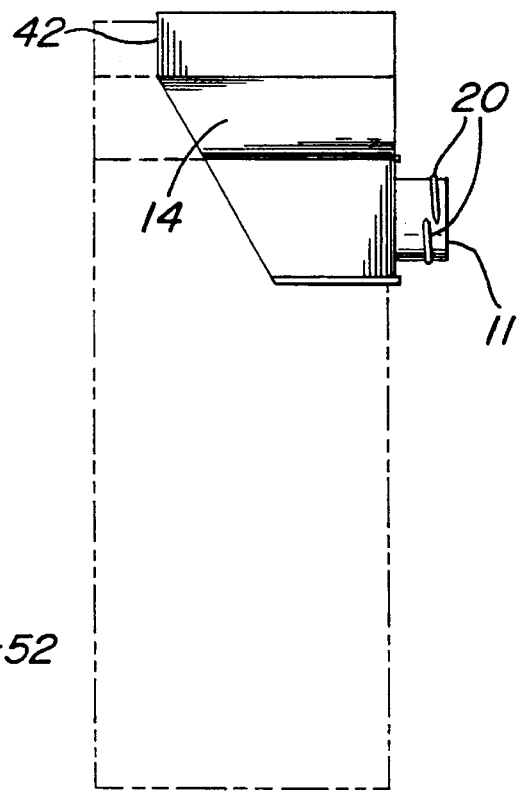
FIG. 3 is a side elevational view of the closure device shown in FIG. 2.

A second embodiment 40 of the present invention is shown in FIGS. 2–4. The second embodiment 40 of the closure device has a spout 11 located in a front wall 16 which is part of a skirt which wraps around the container. The device 40 also includes a pair of inclined gable top walls 14, one of which is shown in FIG. 3.

The device 40 is thus positioned upon the carton by sliding the device 40 thereon, so that the vertical strips of the top of the carton are enclosed and held together by the interior surfaces of the slot 42 in the closure device 40. Moreover, the inclined walls 14 of the device 40 abut and rest upon the inclined panels of the carton. Thus, it is seen that the closure device 40 fits upon the top of the carton, and can close the carton by pressing vertical strips together and guiding the same into the slot 42. Also, the pair of forwardly extending inclined side walls 14 which create a recess 24 to engage the front ends of the inclined panels of the container, slide below the underside of inclined carton walls until the front edges of the carton walls reach the end wall of the device at which point the forwardly extending inclined side walls should reach approximately the midpoint of the vertical strips of the carton. By permitting the pair of forwardly extending inclined side walls 14 to engage the underside of inclined carton walls, the closure device 40 is releasably secured to the carton, so that when one attempts to lift the carton, the closure device 40 aids in lifting and moving the carton.

As shown in FIG. 4, the puncturing tip 22 is located adjacent holes 26 and the length of the puncturing tip need not be as long as that shown in FIG. 7. In fact, a shorter length of the tip 22 in FIG. 4, assists in the removal of the fluid from the container. By pushing the puncturing tip 22 into the container, one can access the container contents and place the device 40 thereon.

The device 40 may also include the stiffening ribs 24 which provide stability to the device 40 and may be integrally molded with the device 40 in a conventional fashion.

Figure 5:
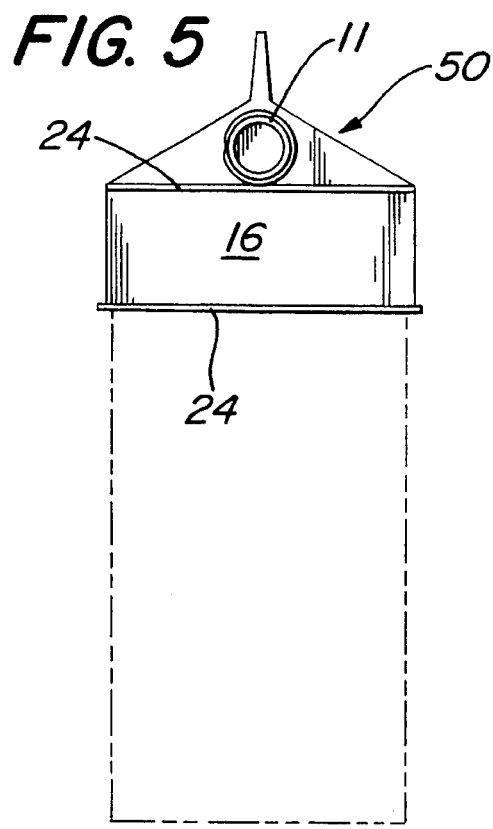
FIG. 5 is a view similar to FIG. 2 of a third embodiment of the closure device of the present invention placed on a container shown in phantom, with the spout of the device being located on the upper portion of the front wall of the device.
Figure 6:
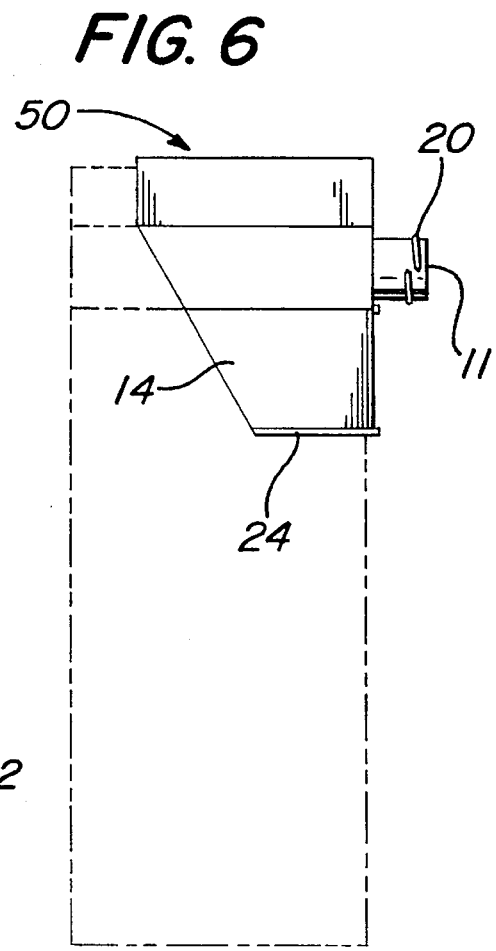
FIG. 6 is a side view of the closure device shown in FIG. 5.

In a third embodiment of the device 50 as shown in FIGS. 5–7, the spout 11 extends outwardly from the upper portion of front wall 16. The puncturing tip 22 (FIG. 7) thus extends through the gable top of the container and must be of sufficient length to reach the interior of the container to dispense the contents thereof. In addition, the tip 22 includes holes 26 to facilitate the removal of the container contents through the spout 11. The device 50, as the other devices of the invention, includes a conventional cap 52 shown in phantom in FIG. 7 to be secured about the spout 11 by conventional threads 20 as shown in FIG. 6. The device 50 may also include stiffening ribs 24 as shown in FIGS. 5 and 6 to stabilize the device 50. The device 50 further includes a sealing ring (not shown) adjacent the spout, as shown in the embodiment of FIG. 4. This device 50 also slides onto the carton.

In the second and third embodiments of the present invention 40 and 50, respectively, the longitudinal width of the device, e.g., of the inclined walls 14 is approximately one-half the width of one of the side walls of the carton. In the first embodiment of the present invention, the width of the device 40 or 50 is approximately the full longitudinal length of one of the side walls of the carton. This width may be varied depending upon the circumstances of use. The device 40 or 50 being of a shorter longitudinal width will be less expensive to manufacture due to the lesser costs for production materials such as plastic, as well as reduced shipping and storage costs for the smaller version. Intermediate width versions may also be utilized depending upon the circumstances of use.

The device of the present invention may be comprised of any suitable low cost, yet strong and rugged material, such as a plastic, metal, composites and the like, depending upon the circumstances of use. The device may be easily manufactured by injection molding into a single piece and in other ways known in the art.

The closure device of the present invention may be sold to the general public for use by consumers to protect the contents of gable top cartons. Another possible method of distribution and sale of the device would be as a "give-away" for advertising and promotional purposes. Thus, the wing or other surfaces of the cap may contain printed or stamped advertising indicia thereon. Additionally, as is not the case with the prior art, the present invention permits the embossing of advertising indicia thereon, for example, on the inclined wings.

Without further elaboration the foregoing will so fully illustrate my invention that others may, by applying current or future knowledge, adapt the same for use under various conditions of service.

I claim:

1. A closure device for a carton having a gable top, the carton comprising an interior and a pair of vertical strips having an upper and lower edge, and inclined sidewalls extending outwardly and downwardly from the lower edge of the vertical strips, the inclined sidewalls each having an upper and lower surface, the strips having inner and outer surfaces, the inner surfaces of the strips being sealed together along their longitudinal length, the closure device comprising a flanged cap including a pair of inner surfaces defining a longitudinal slot, the device further including inclined side walls extending from the flanged cap and adapted to make a snug fit with the gable top, the device further including front and rear walls continuous with the inclined side walls, and angled side walls extending from the rear wall toward front wall, the inclined side walls being spaced a distance apart to define a recess, the cap including a spout and a means for puncturing the container to provide a channel so that the spout is in fluid communication with the carton when placed thereon, wherein the outer surfaces of the strips of the carton are adapted to be disposed within the longitudinal slot in a confining relationship whereupon the inclined sidewalls of the carton are adapted to be at least partially located within the recess.

2. The device of claim 1 wherein the device is formed of a plastic material.

3. The device of claim 1 wherein the flanged cap comprises a longitudinal width which is approximately one-half the longitudinal width of the vertical strips of the carton.

4. The device of claim 1 wherein the flanged cap comprises a longitudinal width which is approximately equal to the longitudinal width of the vertical strips of the carton.

5. The device of claim 1 additionally comprising a seal located adjacent the spout to prevent leakage from the interior of the container when the device is placed on the container.

6. The device of claim 1 wherein the spout is adapted to be located adjacent one of the inclined side walls.

7. The device of claim 1 wherein the side wall of the device includes an upper and lower portion and the spout is located adjacent the upper portion of the front wall and extends therethrough.

8. The device of claim 1 wherein the side wall of the device includes an upper and lower portion and the spout is located adjacent the lower portion of the front wall and extends therethrough.

* * * * *